July 11, 1944. G. E. DUNN 2,353,300
UNIVERSAL JOINT
Filed June 21, 1941
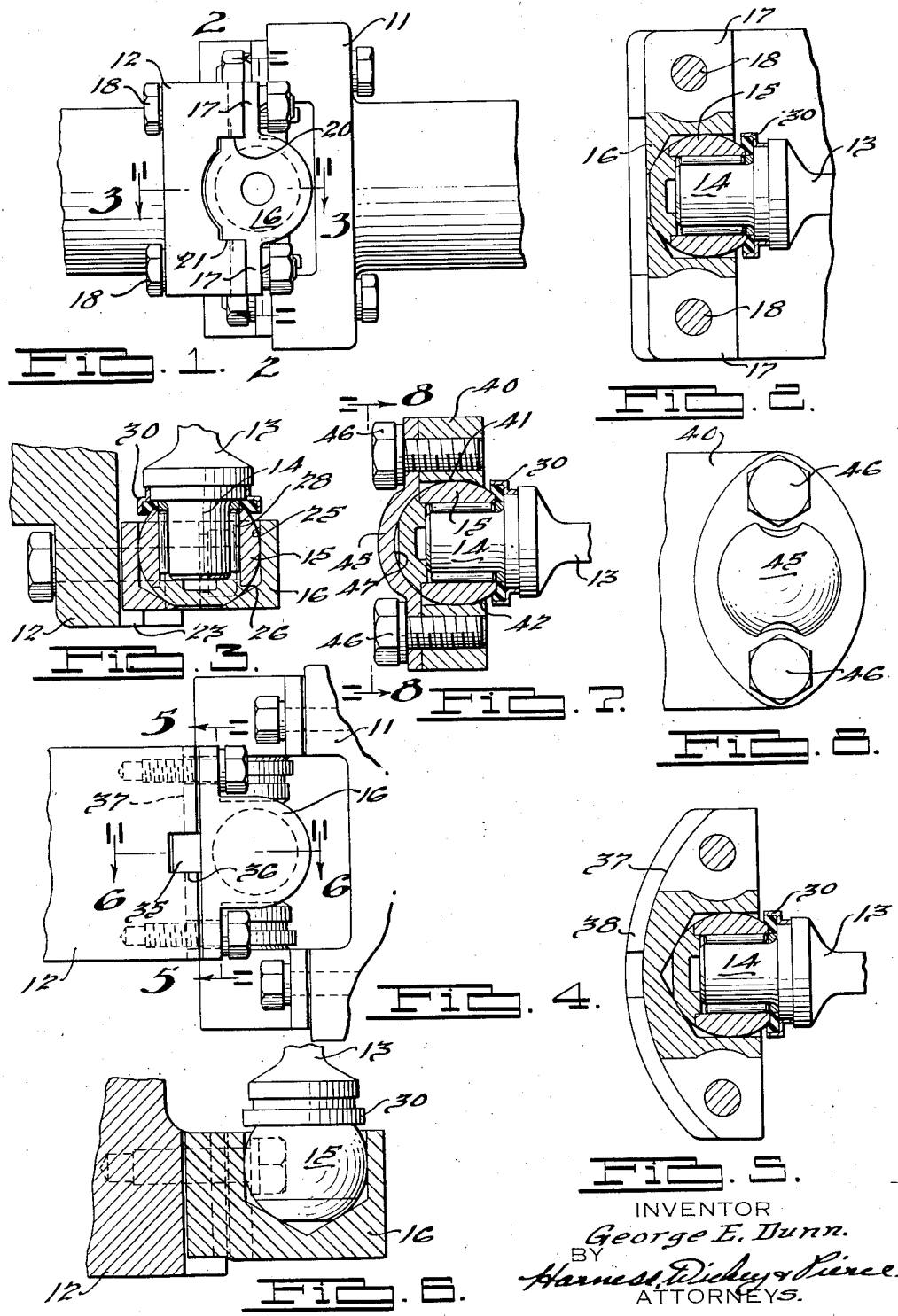
INVENTOR
George E. Dunn.
BY
Harness, Dickey & Pierce
ATTORNEYS.

Patented July 11, 1944

2,353,300

UNITED STATES PATENT OFFICE 2,353,300

UNIVERSAL JOINT

George E. Dunn, Dearborn, Mich., assignor to Universal Products Company Incorporated, Dearborn, Mich., a corporation of Delaware Application June 21, 1941, Serial No. 399,071

1 Claim. (Cl. 64—17)

The invention relates generally to universal joints and it has particular relation to a universal joint of self-aligning character.

In certain respects the invention is related to that embodied in my copending application for patents, Serial No. 353,016, filed August 17, 1940, now Patent No. 2,270,279, issued January 20, 1942, and Serial No. 383,744, filed March 17, 1941, now Patent No. 2,270,280, issued January 20, 1942, both of which relate to universal joints.

In such copending applications for patent, universal joints are disclosed which include cross members having trunnions and ball elements turnable thereon. These ball elements are disposed in sockets provided in yoke members connected to shaft members, respectively. Roller bearings are employed within the balls and around the trunnions and self-aligning of the ball members enables obtaining full roller bearing contact regardless of torque conditions. In such structures, localized roller bearing engagement is avoided, which might otherwise occur through relative movement of the trunnions and yokes circumferentially of the joint axis owing to initial clearances or to flexing or bending of the trunnions under torque load. Full roller bearing contact increases the torque capacity of the joint and if the rollers are subjected to localized bearing engagement, this torque capacity is reduced.

An object of the present invention is to provide an improved universal joint having self-aligning ball elements, wherein the self-aligning features may be incorporated in a known type of joint having bearing blocks removably secured to yoke members.

Another object of the invention is to provide a universal joint of improved character having self-aligning ball elements, which permits ready and rapid assembly of the parts in a direction radially of the joint axis, or, in other words, axially of the trunnions.

Another object of the invention is to provide improved universal joint structures having self-aligning ball members, which can be manufactured inexpensively.

Other objects of the invention will become apparent from the following specification, from the drawing relating thereto, and from the claim hereinafter set forth.

For a better understanding of the invention, reference may be had to the drawing wherein:

Figure 1 is a plan view of a universal joint assembly as constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a view on the order of Fig. 1, but illustrating another form of the invention;

Fig. 5 is a cross-sectional view taken substantially along the line 5—5 of Fig. 4;

Fig. 6 is a cross-sectional view taken substantially along the line 6—6 of Fig. 4;

Fig. 7 is a fragmentary view in cross-section of a universal joint constructed according to another form of the invention;

Fig. 8 is a plan view of the structure shown by Fig. 7.

Referring to Fig. 1, the joint illustrated includes a pair of yoke members 11 and 12 adapted, respectively, to be connected to a pair of shafts. A cross 13 is arranged between the yoke arms and has trunnions 14 disposed in 90° spaced relation and, as shown best by Figs. 2 and 3, each trunnion receives a ball element 15 located in a bearing block 16. The bearing blocks are secured to the yokes by means of opposed wings 17 and fastening bolts 18 and torque driving engagement between the blocks and the yokes is obtained through shoulder engagements indicated at 20 and 21. Outward movement of the blocks radially of the joint is prevented by means of overhanging ledges or shoulders 23 on the yokes which overlap the outer surfaces of the blocks.

For receiving the ball 15, each block 16 has a cylindrical recess 25 aligned with the trunnion 14 and this recess at its outer end terminates in a conical bottom 26 engaging the spherical surface of the ball. The diameter of the cylindrical part 25 of the recess is such that a sufficiently tight engagement occurs between this part of the recess and the ball so that turning of the ball within the recess about the axis of the trunnion normally will be prevented. This engagement is not such, however, as to prevent such tilting of the ball as to maintain it aligned with the trunnion 14, or, in other words, the ball may tilt or turn in the plane of the cross to maintain full roller bearing contact. Between the ball and the trunnion, cylindrical rollers 28 are provided and the bearing assembly is sealed at its inner end as indicated generally at 30. Sealing means such as disclosed and claimed in my copending application for patent, Serial No. 396,647, filed June 5, 1941, now Patent No. 2,338,169, issued January 4, 1944, may be employed for sealing the bearing assembly. Also, it may be noted that the ball is formed in two parts and this structure of ball is disclosed and claimed particularly in my copending application for patent, Serial No. 395,213, filed May 26, 1941, now Patent No. 2,270,281, issued January 20, 1942.

Assembly of the different parts of the joint is effected first by pressing the blocks over the balls 15 after the latter are on the trunnions, until the conical bottoms 26 contact the spherical tops of the balls. Then, by pressing the blocks and balls toward the joint axis, such parts may be brought into proper assembly with the trunnions and sealing means and when properly located, the blocks may be moved axially of the joint to bring them under the ledges or shoulders 23 on the yokes. When this has occurred, the bolt fastening means 18 may be applied.

The structure shown by Figs. 4, 5, and 6 is very similar to that shown by Figs. 1, 2, and 3, with the principal exception that the bearing blocks vary in structure. In this form of the invention, each block is formed with a key 35 disposed in a keyway 36 on the yoke 12 so as to obtain torque driving engagement. As best shown by Fig. 5, the block in this form of the invention has its outer surface curved, with the center of curvature coinciding with the axis of the joint, and a shoulder 37 for holding the block in position radially of the joint is similarly curved. This shoulder projects under a correspondingly curved ledge or shoulder 38 on the yoke and it might be noted here that the yoke is similarly rounded in accordance with the block. In other respects, the joint is like that previously described in so far as the balls and self-aligning features are concerned.

In the structure shown by Figs. 7 and 8, a yoke 40 is provided which has a cylindrical opening 41 which opens towards the outer side of the joint and this opening at the inner side of the yoke arm terminates in a conical wall or bottom ledge 42. The ball 15 is disposed in this opening in a sufficiently tight manner so that the aligning features are maintained while still preventing turning of the ball element about the axis of the trunnion. At its outer end, the opening 41 is closed by means of a cap 45 fastened to the yoke arm by bolts 46 and this cap has a spherical recess 47 in contact with the ball. In assembling this structure, the cross may be tilted so as to place the trunnion in the opening 41 and then the ball may be pressed into the opening and into assembly with the trunnion. Following this, the cap 45 may be applied so as to bring the parts into proper position. It is to be understood that the joint will have four such bearing assemblies and yoke arms.

It is intended that the ball in all cases substantially contact the end of the trunnion so as to serve as a means for centering the cross with respect to the joint axis and that this substantial contact be obtained at a time when the ball has pressure contact with the sealing means so as to obtain an effective seal. With particular reference to the structure shown by Figs. 7 and 8, it is desired that the ball contact the bottom ledge or conical shoulder 42 substantially when the centering contact with the trunnion is obtained, or, in other words, contact of the ball with the end of the trunnion should occur at substantially the same time as contact with the ledge 42. It will be apparent that the cap 45, holding the ball against the ledge 42, serves as a means for properly positioning the ball and in holding it in the opening against turning about the axis of the trunnion, although it should be understood, as stated previously, that turning of the ball in the circumferential plane of the cross is to be permitted for aligning the ball with respect to the rollers and trunnion.

In general, it is to be understood that in each case for each structure shown, the parts are so arranged and constructed that the ball will have effective sealing engagement with the sealing means and by substantial contact with the end of the trunnion will hold the cross centrally of the joint. Also, it is to be understood that the balls will be maintained in their recesses in such positions that they will be equally distant from the joint axis so that their engagement with the trunnions will center the cross. Also, it is to be understood that each bearing block or cap, as the case may be, will be so related to the ball and will be so positioned or held on the yoke that the ball will be held in proper position, or, in other words, equally distant from the joint axis. Again, it is to be appreciated that the ball will normally be held against turning about its own axis, but will under torque loads tilt or turn in the plane of the cross so as to maintain the balls, trunnions, and roller bearings aligned under different torque conditions.

Although more than one form of the invention has been illustrated and described in detail, it will be apparent to those skilled in the art that various modifications may be made without departing from the scope of the appended claim.

What is claimed is:

In a self-aligning universal joint of the four trunnion type, a yoke member, a bearing block detachably connected to the yoke member and having a bore extending radially of the joint axis, a trunnion projecting outwardly into the bore, a ball element having external contact with the wall of the bore and having a bore receiving the trunnion, and means on the block at the outer end of the opening for preventing radially outward movement of the ball and comprising an annular inclined shoulder on the block at the outer end of the bore therein which has circular line contact with an outer spherical surface portion of the ball.

GEORGE E. DUNN.